United States Patent
Nau et al.

(10) Patent No.: US 11,451,114 B2
(45) Date of Patent: Sep. 20, 2022

(54) ELECTRIC MEDIA GAP MACHINE FOR A COMPRESSOR AND/OR A TURBINE, TURBOCHARGER AND/OR TURBINE

(71) Applicants: Robert Bosch GmbH, Stuttgart (DE); BMTS Technology GmbH & Co. KG, Stuttgart (DE)

(72) Inventors: Michael Nau, Aischfeld (DE); Hartmut Weiss, Stuttgart (DE); Johannes Riedl, Munich (DE); Kilian Ertl, Wackersberg (DE); Michael Bäuerle, Eberdingen (DE); Thomas Frühschütz, Holzkichen (DE)

(73) Assignees: Robert Bosch GmbH, Stuttgart (DE); BMTS Technology GmbH & Co. KG, Stuttgart (DE)

( * ) Notice: Subject to any disclaimer, the term of this patent is extended or adjusted under 35 U.S.C. 154(b) by 450 days.

(21) Appl. No.: 16/610,560

(22) PCT Filed: May 2, 2018

(86) PCT No.: PCT/EP2018/061123
§ 371 (c)(1),
(2) Date: Nov. 4, 2019

(87) PCT Pub. No.: WO2018/202668
PCT Pub. Date: Nov. 8, 2018

(65) Prior Publication Data
US 2021/0156300 A1 May 27, 2021

(30) Foreign Application Priority Data
May 4, 2017 (DE) ...................... 10 2017 207 532.5

(51) Int. Cl.
*H02K 1/20* (2006.01)
*H02K 9/04* (2006.01)
(Continued)

(52) U.S. Cl.
CPC ............... *H02K 9/04* (2013.01); *F02B 37/10* (2013.01); *F04D 25/0646* (2013.01); *H02K 5/128* (2013.01); *H02K 7/1823* (2013.01)

(58) Field of Classification Search
CPC ........ H02K 7/1823; H02K 7/14; H02K 7/003; H02K 1/20; H02K 9/04; H02K 9/06; H02K 5/128
See application file for complete search history.

(56) References Cited

U.S. PATENT DOCUMENTS 7,057,316 B2 * 6/2006 Spring ................ E21B 41/0085
310/87
9,083,210 B2 * 7/2015 Chen .................... H02K 15/022
(Continued)

FOREIGN PATENT DOCUMENTS

DE 102013109136 2/2014
DE 102014210451 12/2015

OTHER PUBLICATIONS

International Search Report for Application No. PCT/EP2018/061123 dated Aug. 14, 2018 (English Translation, 2 pages).

*Primary Examiner* — Dang D Le
(74) *Attorney, Agent, or Firm* — Michael Best & Friedrich LLP

(57) ABSTRACT

The invention relates to an electric media gap machine (10) for a compressor and/or a turbine, in particular for a turbocharger of an internal combustion engine, including a shaft (5) which is rotatably mounted in a housing (6) and on which a rotor (11) is arranged in a rotationally fixed manner, a stator (12) which is fixed to the housing and which has at least one multi-phase drive coil (16) for generating a drive magnetic field and multiple stator teeth (15) that protrude radially inward, and a device (17) which is fixed to the stator for optimizing the flow of a medium flowing through the media gap machine. The device (17) has a cover cap (18)
(Continued)

which covers at least the rotor (11) upstream thereof, wherein the cover cap (18) is adjoined by an inner sleeve (19) which surrounds the rotor (11) completely in the circumferential direction and at least partly in the axial direction. The device (17) has an outer sleeve (23) which is arranged coaxially to the inner sleeve (19) such that the only flow path for the medium between the inner sleeve (19) and the outer sleeve (23) is formed solely through the stator (12) of the media gap machine.

20 Claims, 5 Drawing Sheets

(51) Int. Cl.
*F02B 37/10* (2006.01)
*F04D 25/06* (2006.01)
*H02K 7/18* (2006.01)
*H02K 5/128* (2006.01)

(56) References Cited

U.S. PATENT DOCUMENTS

| | | | |
|---|---|---|---|
| 10,110,093 B2 * | 10/2018 | Chou | H02K 9/06 |
| 10,574,114 B2 * | 2/2020 | Carroll | H02K 5/128 |
| 2012/0128512 A1 | 5/2012 | Vande et al. | |

* cited by examiner

ELECTRIC MEDIA GAP MACHINE FOR A COMPRESSOR AND/OR A TURBINE, TURBOCHARGER AND/OR TURBINE

BACKGROUND OF THE INVENTION

The invention relates to an electric media gap machine for a compressor and/or a turbine, in particular exhaust gas turbocharger compressor or micro gas turbine compressor of an internal combustion engine having a shaft which is rotatably mounted in a housing and on which a rotor is arranged in a rotationally fixed fashion, having a stator which is fixed to the housing and which has at least one multi-phase drive winding for generating a drive magnetic field and a plurality of stator teeth which protrude radially inward, and having a device which has the purpose of optimizing the flow for a medium which flows through the media gap machine.

In addition, the invention relates to a compressor and/or to a turbine, in particular exhaust gas turbocharger, having a housing and having a shaft which is rotatably mounted in the housing and on which at least one compressor wheel is arranged in a rotationally fixed fashion, and having an electric media gap machine which has a rotor which is arranged in a rotationally fixed fashion on the shaft and a stator which is fixed to the housing, wherein the stator has a drive winding for generating a drive magnetic field.

Media gap machines and turbochargers of the type mentioned above are already known from the prior art. Therefore, for example German laid-open patent application DE 10 2014 210 451 A1 discloses a turbocharger having an integrated electric media gap machine. Turbochargers, in particular exhaust gas turbochargers, are used, in particular, in automotive engineering to increase the air charge in cylinders of an internal combustion engine, in order to raise the power of the internal combustion engine. Exhaust gas turbochargers which are driven by the exhaust gas flow of the internal combustion engine are frequently used for this purpose. Moreover, it is known to assist a turbocharger electromotively, so that fresh air which is sucked in independently of an exhaust gas flow of the internal combustion engine can be compressed and fed to the internal combustion engine with an increased charge pressure. A combination of the two variants is also already known. In this context, an exhaust gas turbocharger having an electric machine is provided, in order to drive the shaft of the exhaust gas turbocharger on which a compressor wheel and a turbine wheel are arranged in a rotationally fixed fashion. As a result, for example, the charge pressure buildup, which is otherwise delayed, can be sped up decisively.

The implementation of the electromotive assistance by a media gap machine has the advantage that the motor-powered assistance can be integrated into the turbocharger in particular in a way which saves installation space because the sucked-in fresh air is conducted through a media gap formed between the rotor and the stator of the media gap machine. Therefore, the media gap machine can be integrated into the flow pattern in a way which saves installation space. Furthermore, this provides the advantage that the rotor and stator of the media gap machine are cooled by the air flow.

The stator usually has a stator yoke in the shape of a circular ring and stator teeth which protrude radially inward from the stator yoke and which are arranged uniformly spaced apart from one another viewed in the circumferential direction. The stator teeth are usually wrapped by a multi-phase drive winding, wherein the rotating drive magnetic field, which drives the rotor, rotatably mounted by means of the shaft, with a predefinable torque, is generated by energizing the phases of the drive winding by means of power electronics which are provided for this purpose. The rotor expediently has here at least one permanent magnet which interacts with the rotating magnetic field.

The laid-open application already mentioned also discloses providing a device which serves to optimize the flow and for this purpose the stator teeth, which project into the media gap between rotor and stator, and on which the medium to be delivered flows over, imparts a flow-optimized profile, in particular a drop-shaped profile.

SUMMARY OF THE INVENTION

The media gap machine according to the invention has, with respect to the above, the advantage that the flow behavior is further improved by the media gap to the effect that the intensive stator cooling occurs and the depositing of particles, in particular of magnetic or magnetizable particles, on the rotor is prevented or at least largely avoided. The abovementioned advantages are achieved by means of a simple structural measure, without this giving rise to an appreciable increase in the demand for installation space, so that the flow behavior, cooling and the ability to keep the rotor clean are improved even with dimensions of the media gap machine which otherwise remain essentially the same. According to the invention there is provision for this purpose that the device which is fixed to the stator has a cover cap which covers at least the rotor at the end face and is secured, in particular, to the stator teeth. As a result of the arrangement of the cover cap upstream of the rotor or in front of the rotor in the direction of flow it is ensured that the delivery medium does not impinge on a rotor wall which is flat or which is opposed to the flow medium in a perpendicular fashion but rather is directed past the rotor by the cover cap in a flow-optimized fashion. As a result of the arrangement of the cover cap on the stator teeth it is ensured that the cover cap is arranged fixed to the housing so that, in contrast to known solutions, the delivery medium is not made to experience the rotational movement or eddies when it flows against the rotor. As a result, the flow behavior is improved further and turbulence of the flow is avoided, so that, on the one hand, the operation of the compressor is optimized and, on the other hand, the cooling of the stator is also improved. According to the invention there is also provision that an inner sleeve adjoins the cover cap and completely surrounds the rotor circumferentially and axially in the flow direction, at least in certain sections. As a result, the delivery medium is also prevented, behind the cover cap when viewed in the flow direction, from making contact directly with the rotor, as a result of which soiling of the rotor is very largely excluded. The avoidance of deposits on the rotor ensures that no critical imbalance is generated. This is avoided in a simple way by means of the advantageous configuration of the device with the inner sleeve. Moreover, the inner sleeve preferably has recesses for receiving the stator tooth tips for the respective stator tooth. As a result, lateral tangential oscillation of the stator teeth roots with corresponding generation of noise is avoided. Furthermore, the device has an outer sleeve which is arranged coaxially with respect to the inner sleeve, so that the only flow path for the medium between the inner sleeve and the outer sleeve is formed through the stator of the media gap machine. The inner sleeve and outer sleeve therefore define the only media gap which is available for the medium and which is led through the stator and is interrupted in the circumferential direction only by the stator teeth which, however, extend up to or into the inner sleeve. Because the media gap is now not bounded by the stator tooth tips, the rotor or the stator winding itself but rather by the outer sleeve and the inner sleeve, which enclose an essentially annular flow path at the level of the stator teeth, between the stator winding or drive winding and the stator tooth tips, a flow-optimized surface for guiding the medium is made available, which surface permits particularly low-loss flowing of the medium through the media gap machine, wherein the abovementioned advantages with respect to the depositing of particles are also obtained.

According to one preferred development of the invention there is provision that the cover cap is embodied in a flow-optimized fashion, in particular in the shape of a half ovoid, and is arranged in particular with its tip centrically or eccentrically with respect to the rotational axis of the rotor. As a result this produces advantageous direction of the flow for the delivery medium which enters the flow path between the inner sleeve and the outer sleeve. The preferred shape of the cover cap as a half ovoid ensures that the media flow hardly makes any contact, or makes little contact, with the rotor, so that the probability of deposits of particles on the rotor is reduced. At the same time, the media flow is directed outward in the direction of the stator, so that the latter is advantageously cooled. The cover cap is preferably arranged centrically with respect to the rotational axis of the rotor, so that the tip of the cover cap is at the level of the rotational axis. Alternatively, in particular taking into account a pipe elbow which is connected upstream of the media gap machine and which conducts the medium to be delivered from an axis located in a pivoted fashion with respect to the rotational axis to the inlet of the media gap machine, the eccentric or decentralized arrangement of the cover cap, at least of the tip of the cover cap, offset in particular in the direction of the pipe, has the effect of advantageous flow guidance.

The inner sleeve has at least one securing strut, preferably a plurality of radially outwardly protruding securing struts which are designed, in particular, to bear against an end face or be attached to one of the stator teeth in each case. The inner sleeve and therefore the cover cap are therefore oriented and secured by the securing struts which are attached to the stator teeth. As a result of the attachment of the cover cap to the stator teeth by the securing struts of the inner sleeve, it is therefore ensured that the securing cap is integrated into the media gap machine in a way which is simple and saves installation space. Moreover, this implements a simple connection of the cover cap in such a way that it is fixed to the housing.

The securing struts are preferably embodied here in a flow-optimized fashion and cover the respective stator tooth upstream at least in certain areas. Just as the cover cap is located in front of the rotor, the securing struts are therefore located in front of the stator teeth in the media gap and therefore provide the possibility of flow-optimized embodiment for the media gap irrespective of the shape of the stator teeth. The upstream arrangement of the securing struts ensure simple mounting and moreover the securing force is increased by the delivery medium during operation in that the securing struts are pushed against the stator teeth. Secure attachment of the inner sleeve and of the cover cap to the stator teeth is therefore reliably ensured. Moreover, the flow-optimized embodiment of the securing struts, in particular in a common droplet or in a way similar to a droplet or in the shape of a partial droplet, formed with the stator teeth, optimizes the flow behavior of the delivery medium in the media gap, in particular in that turbulence is avoided and an advantageous media flow for cooling the stator is produced or ensured. In the simplest case, the separation of the drop-shaped profile occurs between the respective securing strut and the associated stator teeth at the location with the greatest profile thickness.

According to one preferred development of the invention there is provision that the securing struts are each connected, in particular in one piece, to an outer sleeve, which is arranged coaxially with respect to the inner sleeve, at their end facing away from the inner sleeve. Therefore, a media gap in particular in the shape of a circular ring, is made available for the delivery medium between the inner sleeve and the outer sleeve, which media gap is interrupted only by the securing struts viewed in the circumferential direction. Because the securing struts are attached to the stator teeth, this means that the stator teeth project into this media gap and as a result ensure advantageous and high-power operation of the media gap machine. The securing struts, which are embodied, in particular, in a flow-optimized fashion, keep the influence of the stator teeth on the delivery medium low here. The inner sleeve and outer sleeve therefore provide an advantageous flow conduit for the delivery medium through the media gap machine.

The inner sleeve, the securing struts, the outer sleeve and the cover cap are particularly preferably embodied in one piece with one another. This provides an advantageous mounting part which can be easily handled and can be mounted in/on the media gap machine. The abovementioned device is formed at least essentially by this mounting part. The mounting part is embodied here in such a way that simple mounting on the stator and arrangement with respect to the rotor is ensured. Therefore, according to one embodiment there is, for example, provision that the mounting part is designed to be pushed axially onto the stator or onto the stator teeth of the stator. In particular there is provision that the inner sleeve and/or the outer sleeve have axial receptacle depressions for each receiving one stator tooth. As a result, the mounting part can easily be attached to the stator teeth in that the mounting part is pushed axially, with the receptacle depressions, onto the mounting teeth. The receptacle depressions preferably have lead-in chamfers in order to facilitate the arrangement and orientation of the mounting part with respect to the media gap machine and to ensure secure mounting. In order to attach the mounting part to the stator there is, in particular, provision that a securing force is obtained by means of a press fit, clamping and/or by additional attachment means such as, for example, adhesive or the like. According to an alternative embodiment there is preferably provision that the inner sleeve and/or the outer sleeve have radial receptacle depressions for each receiving one stator tooth. Because in this context axial pushing on is not possible, in this case the stator is preferably composed of a plurality of stator parts. The stator is therefore interrupted, for example, along the stator yoke at a plurality of locations so that in each case one stator tooth lies on an individual stator yoke section, so that the stator teeth can be pushed radially into one radial receptacle depression each until the stator yoke sections bear one against the other in the circumferential direction and are connected, in particular welded, to one another there. The unit composed of the stator and device subsequently can no longer be released without destroying it which permits simple handling of this unit.

Furthermore, there is preferably provision that a plurality of radially outwardly protruding coil mounts for coils of the drive winding are arranged on the outer sleeve, and embodied, in particular, in one piece with the outer sleeve. The drive winding is advantageously formed here by a plurality of easy-to-handle coils. The coil mounts are embodied in such a way that the coils can be easily attached and mounted thereon. In particular there is provision that the coils can be pushed radially into the coil mounts, in order to be attached to the mounting part. The mounting part therefore no longer serves only for optimizing the flow but also at the same time as a carrier for the drive winding which is then not arranged directly on the stator but rather on the mounting part. The mounting part is preferably manufactured from plastic so that the mounting part simultaneously produces an electrical insulator between the different coils and the stator. Moreover, the manufacture from plastic is cost-effective and also permits a complex shape of the mounting part. The coil mounts are preferably embodied in such a way that they have a radial breakthrough, through which the stator teeth of the stator project. According to a first embodiment, the breakthrough is preferably also embodied with axially open edges so that the stator teeth can be inserted axially into the coil mount so that the coils can subsequently be mounted on the coil mounts. The stator teeth are then subsequently connected to one another by means of a common stator yoke, wherein for the purpose of the stator teeth are preferably permanently connected to the stator yoke, in particular welded thereto. According to one alternative embodiment there is preferably provision that the coil mounts only have one radial breakthrough, so that the stator teeth are inserted radially into the coil mount for the purpose of mounting and subsequently the coils are mounted on the respective coil mount, and finally the stator teeth are connected to the stator yoke as described above.

According to one preferred development of the invention there is provision that a coil mount is present for each stator tooth. This ensures that a coil of the winding can be arranged on each stator tooth. The coils can be embodied separately from one another or else coherently with respect to one another here. By virtue of the fact that the coil mounts are present also radially outside the outer ring, the coils or the drive winding also lie outside the outer ring so that the flow conduit between the inner sleeve and outer sleeve is embodied without coils, so that the delivery medium which flows through the delivery conduit is not influenced by the coil and is guided in an optimum fashion through the inner ring, outer ring and securing struts as well as cover cap.

Each coil mount preferably has a latching apparatus for attaching a coil or a coil part of the drive winding. The coils or coil parts of the drive winding can be locked on the respective coil mount in a simple way by means of the latching apparatus. In particular, the latching apparatus acts radially so that the coils are prevented from being easily detached from the respective coil mount. In particular, the latching apparatus interacts here in a positively locking fashion with the coil which is arranged on the respective coil mount. The respective latching apparatus is also expediently embodied in a detachable fashion in order to remove a coil or a coil part when necessary.

Furthermore there is preferably provision that the respective latching apparatus has at least one laterally protruding latching tab of a coil mount, which latching tab springs back elastically when a coil is pushed radially onto the respective coil mount. The latching apparatus ensures that the respective coil cannot automatically become detached of its own accord from the respective coil mount during operation of the media gap machine. Instead, positive locking of the coil on the respective coil mount is ensured by the latching tab. During mounting, the latching tab springs back elastically so that simple mounting is ensured. For this purpose, the latching tab preferably has an activation chamfer which, when the coil is pushed on, forces the latching tab back elastically, and a stop which faces away from the activation chamfer and against which the coil can be pushed radially outward without overcoming said stop. In order to release or exchange the coil, all that is necessary is to deflect or move the latching tab manually into its release position. This ensures simple and secure mounting of the coils on the mounting part.

Furthermore there is preferably provision that the rotor is attached to the shaft or to a shaft end of the shaft on the shaft by means of a threaded connection. In particular, the threaded connection permits the rotor to be easily mounted on a shaft of an existing turbocharger, in particular exhaust gas turbocharger. For this purpose, all that is necessary is to form a thread on the free front end of the shaft, which thread interacts with a corresponding opposing thread on the rotor so that the rotor can be attached at its end face to the shaft with its rotor shaft which has the opposing thread. If the rotor is arranged directly on the shaft, the advantage of a saving in axial installation space is obtained.

The shaft or the rotor preferably to have an annular projection whose outer diameter is larger than the inner diameter of the inner sleeve and up to which the inner sleeve can be pushed axially onto the shaft or the rotor. The annular projection therefore forms an axial termination for the inner sleeve, as a result of which axial termination the rotor is completely housed by the mounting part or the inner sleeve and the cover cap. The inner sleeve which adjoins the annular projection axially seals off the rotor with a narrow-tolerance airgap from the surroundings so that reliable protection of the rotor, in particular against particles of dirt, is ensured.

There is particularly preferably provision that at least one permanent magnet of the rotor protrudes axially downstream beyond the stator or the stator teeth. As a result, an axial force counter to the direction of flow of the delivery medium is produced via reluctance forces, which axial force causes the rotor movement in the turbocharger to be stabilized. The rotor preferably has at least one permanent magnet, which ensures a particularly compact design. However, the rotor can alternatively also have more than one permanent magnet.

There is also preferably provision that the device is embodied as a component of the stator which cannot be separated from the stator. In particular, the device has here the inner sleeve, the cover cap, the securing struts, the outer sleeve and the coil mounts which are embodied in one piece with one another and arranged on the stator in such a way that they cannot be detached therefrom in a non-destructive fashion. In other words, the device forms the stator, or the stator forms the device.

The turbocharger according to the invention is distinguished by the inventive embodiment of the media gap machine. This results in the advantages already mentioned.

BRIEF DESCRIPTION OF THE DRAWINGS

Further advantages and preferred features and feature combinations emerge, in particular, from what is described above and from the claims. The invention will be described in more detail below with reference to the drawing, in which:

DETAILED DESCRIPTION

Figure 1:
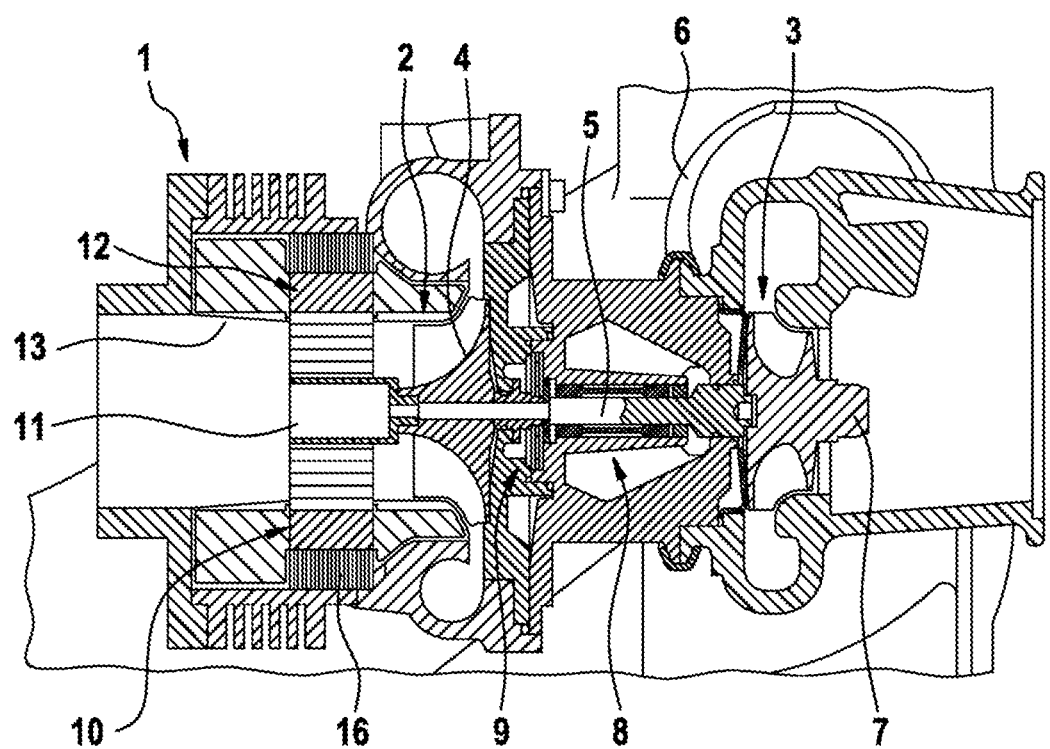
FIG. 1 shows an exhaust gas turbocharger having a media gap machine in a simplified longitudinal sectional illustration.

FIG. 1 shows, in a simplified longitudinal sectional illustration, an exhaust gas turbocharger 1 which has a compressor 2 and a turbine 3. The compressor 2 has a compressor wheel 4 which is arranged on a shaft 5 in a rotationally fixed fashion. The shaft 5 is itself rotatably mounted in a housing 6 of the exhaust gas turbocharger 1. At an end of the shaft 5 facing away from the compressor wheel 4, a turbine wheel 7 of the turbine 3 is also connected in a rotationally fixed fashion to the shaft 5. When the exhaust gas of an internal combustion engine flows against the turbine wheel 7 and as a result drives it, the compressor wheel 4 is also made to rotate, so that fresh air fed to the compressor wheel 4 is compressed and fed to the internal combustion engine.

The rotatable mounting of the shaft 5 in the housing 6 can be implemented in different ways. According to a first exemplary embodiment there is provision that the shaft 5 is rotatably mounted by at least two bearings 8 and 9 in the housing 6. Two rolling element bearings are present as bearings 8, 9. In order to axially support the shaft 5 it is also possible to provide that one of the rolling element bearings is embodied as an axial rolling element bearing.

Alternatively, and according to the exemplary embodiment shown in FIG. 1, there is provision that the bearing 8 is embodied as a magnetic bearing, and the bearing 9, which serves as an axial bearing, as a rolling element bearing.

So that, in particular, the compressor 2 can be driven independently of the exhaust gas flow of the internal combustion engine, permitting a high cylinder air charge to be obtained in the cylinders of the internal combustion engine at any time, there is also provision here that the exhaust gas turbocharger 1 has an electric media gap machine 10. The latter is integrated into the compressor 2 here, wherein a rotor 11 of the media gap machine 10 is arranged in a rotationally fixed fashion on the end of the shaft 5 facing away from the turbine wheel 7. The stator 12 which interacts with the rotor 11 is arranged coaxially with respect to the rotor 11 and fixed to the housing, in the flow conduit 13, leading to the compressor wheel 4, of the exhaust gas turbocharger 1.

Figure 2:
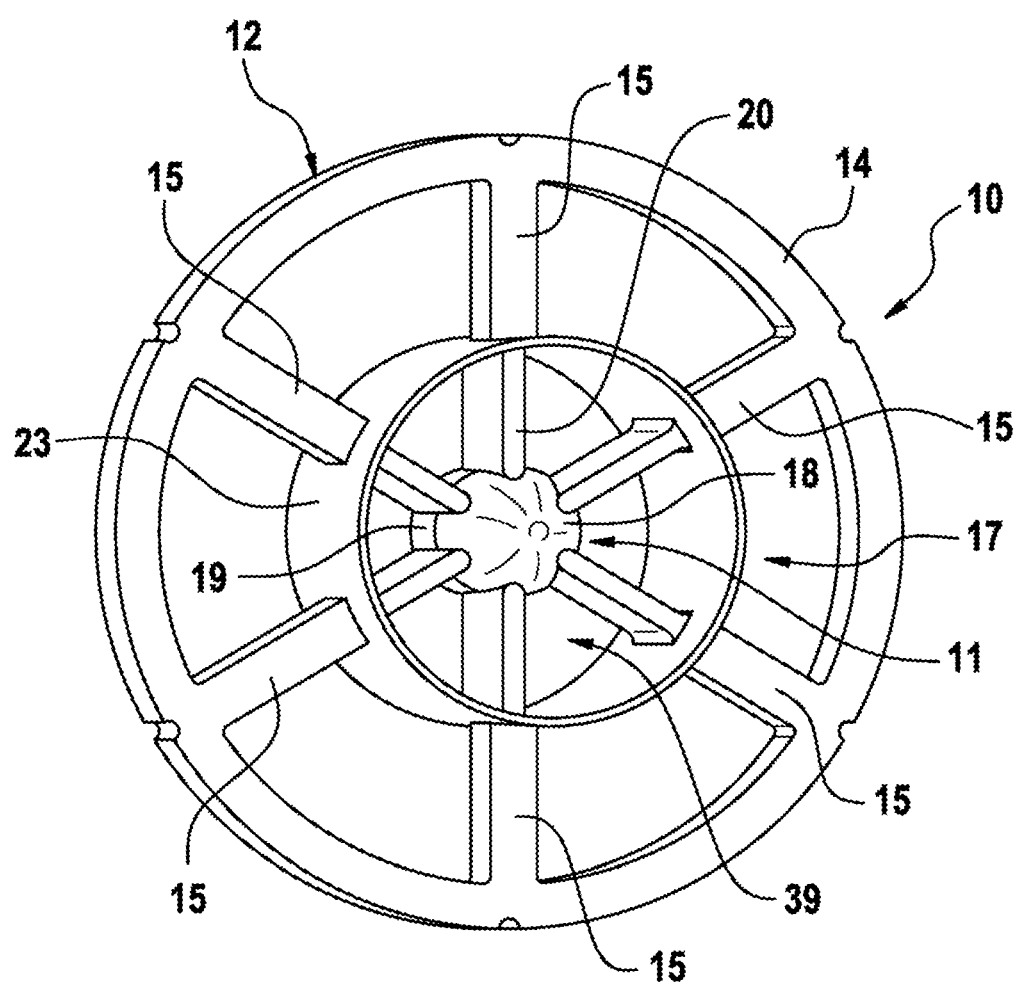
FIG. 2 shows a perspective illustration of the media gap machine.

FIG. 2 shows a simplified perspective illustration of the media gap machine 10. In particular, the stator 12 and rotor 11 of the media gap machine 10 are shown here. The stator 12 has a stator yoke 14 which is in the shape of a circular ring and from which a plurality of stator teeth 15 which are arranged distributed uniformly over the circumference of the stator yoke 14 protrude radially inward and point in the direction of the rotor 11 or of the rotational axis of the shaft 5. The stator teeth 15 end at a radial distance from the rotor 12, so that an airgap remains in each case between the stator teeth 15 and the rotor 12.

The stator 12 is provided with an, in particular, multi-phase drive winding 16, as shown, for example, in FIG. 1. The drive winding 16 can be embodied by a winding wound over the stator or a winding plugged radially onto the stator teeth 15, composed of a plurality of coils, wherein at least one coil is pushed onto each stator tooth. More details will be given on this later.

The media gap machine 10 also has a device 17 which is designed to optimize the flow behavior of the delivery medium which is delivered by the exhaust gas turbocharger 1, that is to say the fresh air, through the media gap machine 10. For this purpose, the device 17 has a cover cap 18 which is assigned to the rotor 11. During correct use, the cover cap 18 is arranged upstream of the rotor 11 and assigned to, or connected upstream of, the upstream front face of the rotor 11. The cover cap 18 is in the shape of a half ovoid, wherein a tip of the cover cap 18 preferably lies at the level of the rotational axis of the shaft 5 or of the rotor 11. Alternatively, in particular if a pipe elbow is connected upstream of the media gap machine, the cover cap 18 is not arranged centrically but rather eccentrically with respect to the rotational axis of the shaft 8 or of the rotor 11, or is offset with respect thereto.

Figure 5:
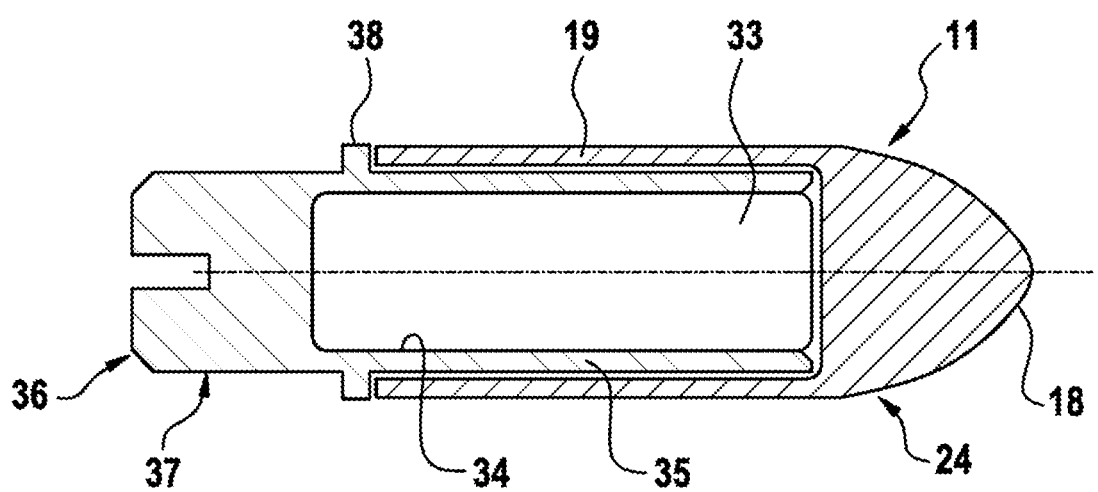
FIG. 5 shows a longitudinal sectional illustration through the media gap machine in the region of a rotor.

The cover cap 18 merges at the axial end facing away from the tip in an inner sleeve 19 whose inner diameter is greater than that of the rotor 11, so that the latter is held in the inner sleeve 19, as is shown, for example, in FIG. 5.

Protruding from the inner sleeve 19 are a plurality of securing struts 20 which extend radially outward, wherein in each case one securing strut 20 is provided in a way which corresponds to the stator teeth 15. In this context, the securing struts 20 are arranged in accordance with the distribution of the stator teeth 15, so that in the final mounted position of each securing strut 20 lies upstream of a stator tooth 15. The securing struts 20 also have a flow-optimized profile here, in order to guide the delivery medium past the stator teeth 15 with as little loss as possible.

Figure 6:
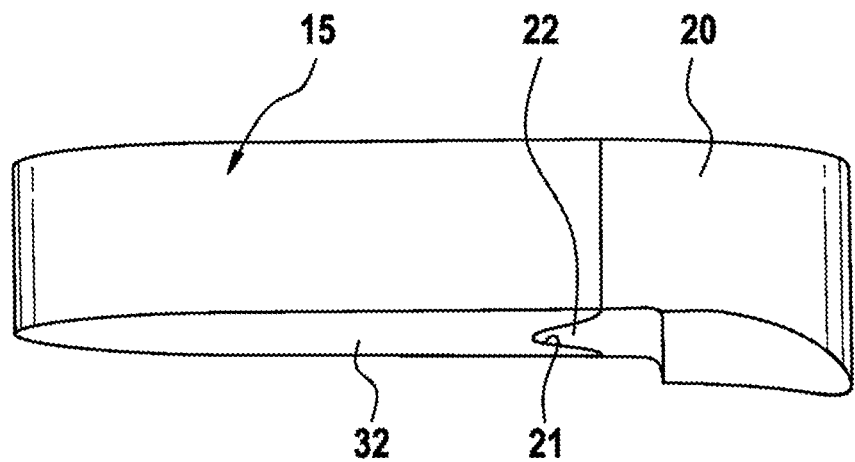
FIG. 6 shows a view of a detail of the media gap machine.

FIG. 6 shows in this respect a simplified view of a detail of a stator tooth 15 as well as a securing strut 20 which is assigned to the stator tooth 15. The securing strut 20 has a droplet-shaped profile and merges in a flush fashion at its side faces with the stator tooth 15 or the side faces of the stator tooth 15, so that no turbulences are produced at the junction. In particular there is provision that the respective securing strut 20 forms, with the associated stator tooth 15, a droplet shape or wing shape as shown in FIG. 6.

In order to mount the composite of the sleeves 19, 23, of the securing struts 20 and cover cap 18 on the stator teeth 15 there is preferably provision that the stator teeth 15 each have a depression 21 into which the securing struts 20 can each be pushed with a projection 22 which corresponds to the depression 21, as shown, for example, in FIG. 6. Alternatively, an inverted embodiment can be implemented in which the stator teeth 15 are plugged in certain areas into the respective securing strut 20.

The securing struts 20 end radially outwardly on an outer ring 23 whose outer diameter is smaller than that of the stator yoke 14, so that the drive winding 16 can be arranged between the outer ring 23 and stator yoke 14. The outer ring 23 is arranged coaxially with respect to the inner ring 19 and extends, like the inner ring, axially through the media gap machine 10 in such a way that it protrudes axially from the stator teeth 15 on both sides, as is shown, in particular, in FIG. 2.

Figure 3A:
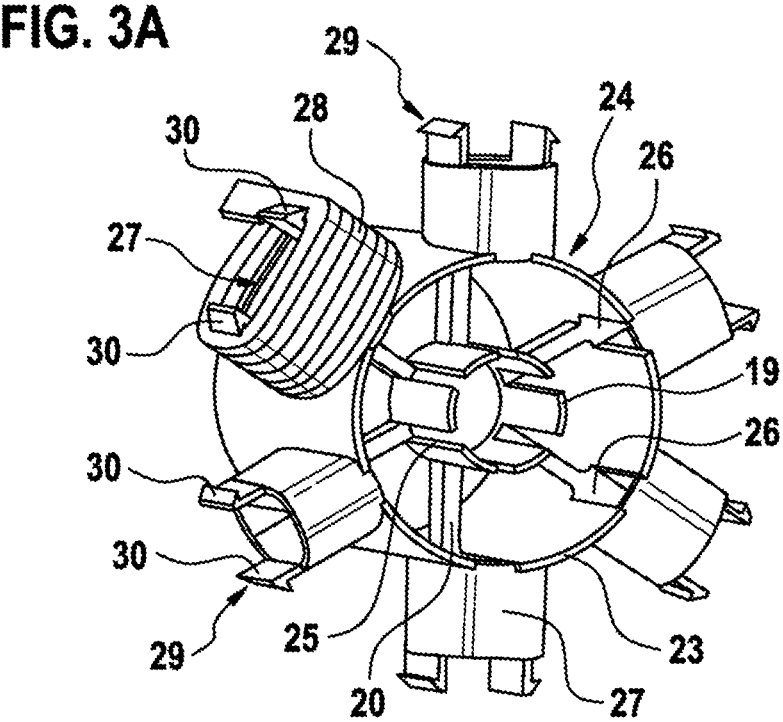
FIGS. 3A and 3B show a mounting part of the media gap machine in a perspective front view and rear view.
Figure 3B:
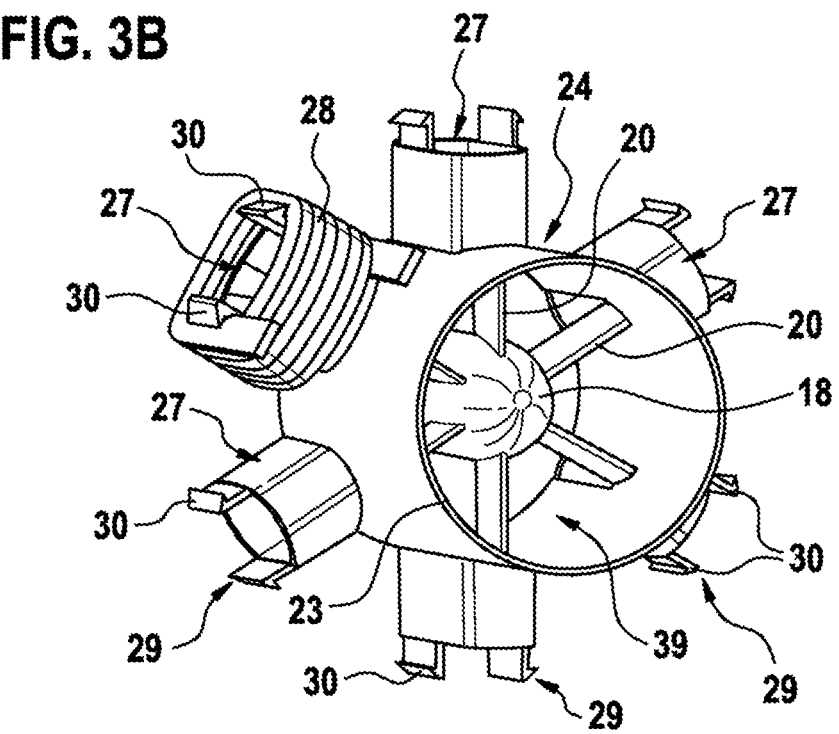

FIGS. 3A and 3B show, each in a perspective rear view (FIG. 3A) and in a perspective plan view (FIG. 3B), an advantageous mounting part 24 which is formed by the inner ring 19, the securing struts 20 and the outer ring 23. The inner ring 19, the securing struts 20 and the outer ring 23 are advantageously embodied in one piece with one another and manufactured from plastic. This gives rise to the advantageous mounting part 24 which can be easily mounted in the media gap machine 10. In this context, at least the inner sleeve 19 is embodied in a slotted fashion so that it has a plurality of axial receptacle depressions 25, one for each stator tooth 15. Therefore, the inner sleeve 25 can be plugged axially onto the rotor and stator. The arrangement of the axial receptacles 25 corresponds here to the arrangement of the securing struts 20, so that correct orientation of the securing struts 20 with respect to the stator tooth 15, shown in FIG. 2, is made possible. The outer sleeve 23 has, according to a first exemplary embodiment, depressions which correspond to the axial depressions 25, so that the outer ring 23 can be pushed onto the stator teeth.

Alternatively and according to the exemplary embodiment shown here in FIGS. 3A and 3B, there is, however, provision that the stator teeth 15 are mounted radially. For this purpose, the outer sleeve 23 has a plurality of radial recessed depressions, or radial breakthroughs 26, through each of which a stator tooth 15 can be inserted radially in the direction of the rotor 11. In particular, the stator is divided into a plurality of stator segments, wherein each stator segment has a stator yoke segment on which just one stator tooth 15 is arranged or formed. The stator teeth 15 are pushed radially into the radial breakthroughs 26 by the outer sleeve 23 until they arrive against the inner sleeve 19 or project into radial receptacle depressions or breakthroughs provided there until the stator yoke segments bear one against the other in the circumferential direction and are connected to one another. In particular, the stator yoke segments are welded to one another. This results in an inseparable unit composed of the stator 12 and the device 17.

According to the present exemplary embodiment, there is also provision that each breakthrough 26 is assigned a coil mount 27. The respective coil mount 27 protrudes in each case radially outward from the outer ring 23 and has in each case an oval-shaped contour with flattened faces in the circumferential direction. A coil 28 of the drive winding 16 can be pushed radially onto each of the coil mounts 27, as shown in FIGS. 3A and 3B or else in FIGS. 4A and 4B. The coil mounts 27 advantageously each have a latching apparatus 29 which is formed by two latching tabs which can be moved elastically and which are arranged or formed on the end of the coil mounts 27 facing away from the outer ring 23. The latching tabs 30 are, in particular, embodied in one piece with the coil mounts 27, which are preferably also embodied in one piece with the outer ring 23. The latching tabs 30 of a coil mount 27 are designed to spring toward one another when a coil 28 is pushed radially onto the coil mount 27. As soon as the coil 28 has reached its final mounted position, the latching tabs 30 snap back and therefore secure the respective coil 28 in a positively locking fashion on the respective coil mount 27, as is shown in FIGS. 3A and 3B.

The advantageous mounting part 24 therefore has an inner sleeve 19, outer sleeve 23, securing struts 20 and coil mounts 27 and is preferably embodied in one piece. The mounting advantageously takes place in such a way that the coils 28 are first attached to the coil mount 27 before the stator teeth 15 are guided through the respective breakthrough 26 and connected to the stator yoke 14.

Figure 4A:
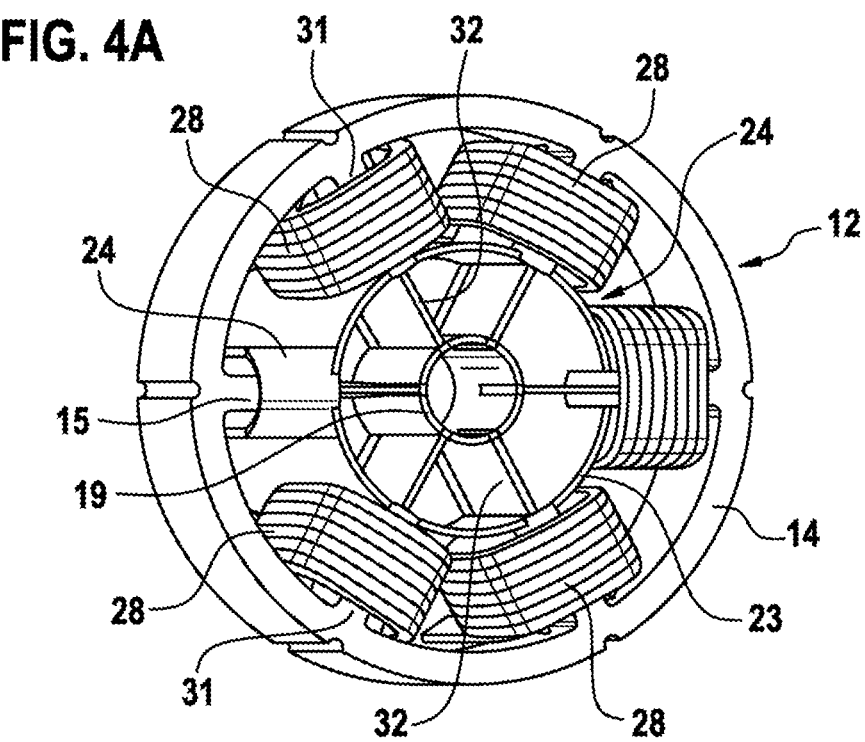
FIGS. 4A and 4B show the media gap machine in a further perspective front view and rear view.
Figure 4B:
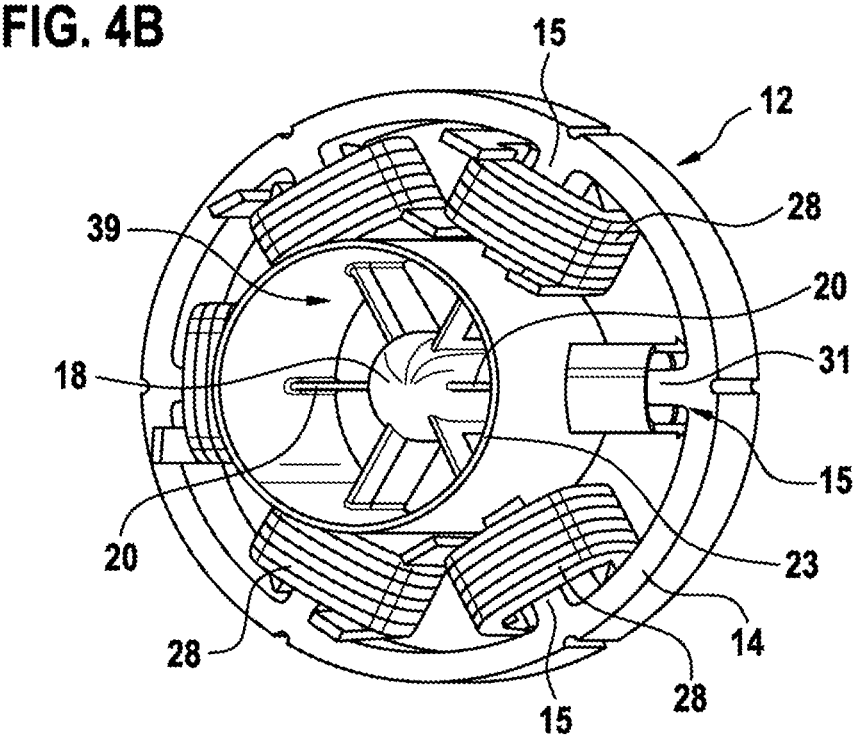

FIGS. 4A and 4B each show the mounting part 24 with a mounted stator 12 and a plurality of coils 28, each in a perspective rear view (FIG. 4A) and in a perspective plan view (FIG. 4B). The coils 28 are preferably arranged on the coil mounts 27, distributed uniformly over the circumference of the mounting part 24. In each case at least one coil 28 is particularly preferably arranged on each coil mount 27. According to the present exemplary embodiment of FIGS. 4A and 4B, for the purposes of illustration in each case one coil mount 27 is provided without a coil 28. However, it is also optionally conceivable for a plurality of coils 28 to be arranged distributed irregularly over the circumference of the mounting part 24 on the coil mounts 27, as is shown, for example, in FIGS. 4A and 4B.

According to the present exemplary embodiment, the stator teeth 15 are ach formed from a base section 31 and a flux conducting element 32. The flux conducting element 32 is preferably made narrower here than the base part 31 and assigned to the rotor 11. In particular, the flux conducting elements 32 end in the inner sleeve 19, so that the inner sleeve has, on its inner side, a flush or continuous cylindrical lateral face, as can be seen, in particular in FIG. 4A.

FIG. 5 shows the rotor 11 of the media gap machine 10 in a simplified longitudinal section illustration. The rotor 11 has a permanent magnet 33 which rests in an axial receptacle depression 34 in a rotor shaft 35. Alternatively, the receptacle depression 34 can also be formed directly in the shaft 5. The axial depression 34 forms a lateral wall which surrounds the permanent magnet 33 circumferentially and therefore forms a reinforcement which, even at high rotational speeds, protects the permanent magnet 33 against damage which could arise from the acting centrifugal forces. The rotor shaft 35 is connected here to the shaft 5 at its front end by a threaded connection 36. In order to ensure that the rotor shaft 35 is screwed securely onto the shaft 5, the rotor shaft 35 has, at its end section facing the shaft 5, a polygonal contour which forms a key face 37 on which a tool key for applying the tightening torque during the mounting of the rotor 11 on the shaft 5 can act. At a distance from the key face 37, the rotor shaft 35 also has an annular projection 38 which extends over the entire circumference and whose outer diameter is larger than the inner diameter of the inner sleeve 19. As is shown in FIG. 5, the mounting part 24 is pushed, with the cover cap 18 and the inner sleeve 19, onto the rotor shaft 35 up close to the annular projection 38. As a result, the permanent magnet 33 is securely protected in the interior against magnetic or magnetizable particles of dirt. A minimum axial and radial distance expediently remains between the inner sleeve 19 and the annular projection 38, so that during operation no friction is produced between the mounting part 24 and the rotor 11 owing to the relative movement of the rotor 11 with respect to the mounting part 24.

The advantageous refinement of the media gap machine 10 has the advantage that an advantageous and flow-optimized flow conduit 39 for the medium to be delivered or the charge air is formed between the inner sleeve 19 and the outer sleeve 23, which flow conduit 39 leads only through the stator 12 or through the intermediate spaces of the stator 12 which lie between the stator teeth of the stator 12, wherein the medium is conducted through the outer sleeve 23 and past the drive winding 16, and through the inner sleeve 19 and past the rotor 11. Because the stator teeth 15 project into the inner sleeve 19, the medium does not pass into a gap between the rotor 11 and stator 12. The advantageous embodiment of the cover cap 18 ensures that the inflowing delivery medium is directed essentially past the rotor and is instead operated in the direction of the stator 12, so that the latter experiences advantageous cooling and the depositing of particles of dirt on the rotor is avoided. Because the stator teeth 15 nevertheless all end close to the rotor and therefore only a small airgap is present between the stator teeth 15 and the rotor 11, the electromagnetic property is improved by the lower magnetic resistance. If the rotor 11 and the flux conducting elements 32 are located in the wind shadow of the mounting part 24, eddying in the air stream is reduced and the flow against the compressor wheel 4, located axially behind the rotor 11, is improved. Whereas in the present exemplary embodiment the number of securing struts 20 corresponds to the number of flux conducting elements 23, according to the further exemplary embodiment a number which deviates therefrom can also be provided. In particular, more securing struts can be present on flux conducting elements. At least the outer sleeve 23 is advantageous of conical design, in order to increase flow speeds of the compressor wheel 4.

The flow-optimized configuration of the securing struts 20 permits an improvement of the geometry of the flux conducting elements 23. As is apparent from FIG. 6, the securing struts 20 constitute the upstream-located part of the flow profile up to the maximum profile width. The flux conducting elements 23 constitute in geometrical terms the shape of the outflowing profile. As a result, the upstream-located part of the flow line profile is formed by the securing struts 20, the expenditure on shaping the flux conducting elements 32 is reduced, which reduces manufacturing costs. In addition, the central cross section of the flow conducting elements 32, which is produced in the magnetic flux in this region, is additionally made larger. Therefore, the electromagnetic properties of the machine 10 with respect to its maximum power are also improved.

The permanent magnet 33 is advantageously arranged and embodied in such a way that it protrudes axially over the stator 12 on the side facing away from the cover cap 18. Owing to the resulting reluctance forces, an axial force is generated which counteracts the flow and as a result ensures improved smooth running of the rotor 11.

The invention claimed is:

1. An electric media gap machine (10) for a compressor and/or a turbine, having a shaft (5) which is rotatably mounted in a housing (6) and on which a rotor (11) is arranged in a rotationally fixed fashion, having a stator (12) which is fixed to the housing and which has at least one multi-phase drive winding (16) for generating a drive magnetic field and a plurality of stator teeth (15) which protrude radially inward, and having a device (17) which is fixed to the stator and has the purpose of optimizing the flow for a medium which flows through the media gap machine, wherein the device (17) has a cover cap (18) which covers at least the rotor (11) upstream, wherein an inner sleeve (19) adjoins the cover cap (18) and completely surrounds the rotor (11) circumferentially and axially, at least in certain sections, and wherein the device (17) has an outer sleeve (23) which is arranged coaxially with respect to the inner sleeve (19), so that the only flow path for the medium between the inner sleeve (19) and the outer sleeve (23) is formed only through the stator (12) of the media gap machine.

2. The media gap machine as claimed in claim 1, characterized in that the cover cap (18) is embodied in a flow-optimized fashion, and is arranged centrically or eccentrically with respect to the rotational axis of the rotor (11).

3. The media gap machine as claimed in claim 1, characterized in that a plurality of radially outwardly protruding securing struts (20) are arranged on the inner sleeve (19).

4. The media gap machine as claimed in claim 3, characterized in that the securing struts (20) are embodied in a flow-optimized fashion and cover the respective stator tooth (15) upstream at least in certain areas.

5. The media gap machine as claimed in claim 3, characterized in that the securing struts (20) are each connected to the outer sleeve (23), at an end facing away from the inner sleeve (19).

6. The media gap machine as claimed in claim 3, characterized in that the cover cap (18), the inner sleeve (19), the securing struts (20) and the outer sleeve (23) are embodied in one piece with one another.

7. The media gap machine as claimed in claim 3, characterized in that the securing struts (20) are each connected in one piece to the outer sleeve (23), at an end facing away from the inner sleeve (19).

8. The media gap machine as claimed in claim 1, characterized in that the inner sleeve (19) and/or the outer sleeve (23) have axial receptacle depressions (25) for each receiving one stator tooth (15).

9. The media gap machine as claimed in claim 1, characterized in that a plurality of radially outwardly protruding coil mounts (27) for coils (28) of the drive winding (16) are arranged on the outer sleeve (23).

10. The media gap machine as claimed in claim 9, characterized in that the coil mounts (27) are embodied in one piece with the outer sleeve (23).

11. The media gap machine as claimed in claim 9, characterized in that a coil mount (27) is respectively present for each stator tooth (15).

12. The media gap machine as claimed in claim 9, characterized in that each coil mount (27) has a latching apparatus (29) for attaching a coil (28) or a coil part of the drive winding (16).

13. The media gap machine as claimed in claim 1, characterized in that the shaft (5) or the rotor (11) has an annular projection (38) whose outer diameter is larger than the inner diameter of the inner sleeve (19) and up to which the inner sleeve (19) can be pushed axially onto the shaft (5) or the rotor (11).

14. The media gap machine as claimed in claim 1, characterized in that at least one permanent magnet (33) of the rotor (11) protrudes axially downstream beyond the stator (12) or the stator teeth (15).

15. The media gap machine as claimed in claim 1 characterized in that the device (17) is embodied as a component of the stator (12) which cannot be separated from the stator (12).

16. A compressor and/or turbine having a housing (6) and having a shaft (5) which is rotatably mounted in the housing (6) and on which at least one compressor wheel (4) or turbine wheel is arranged in a rotationally fixed fashion, and having an electric media gap machine (10) which has a rotor (11) which is arranged in a rotationally fixed fashion on the shaft (5) and a stator (12) which is fixed to the housing, wherein the stator (12) has a drive winding (16) for generating a drive magnetic field, the compressor and/or turbine also having an media gap machine (10) as claimed in claim 1.

17. An exhaust gas turbocharger having a housing (6) and having a shaft (5) which is rotatably mounted in the housing (6) and on which at least one compressor wheel (4) or turbine wheel is arranged in a rotationally fixed fashion, and having an electric media gap machine (10) which has a rotor (11) which is arranged in a rotationally fixed fashion on the shaft (5) and a stator (12) which is fixed to the housing, wherein the stator (12) has a drive winding (16) for generating a drive magnetic field, the exhaust gas turbocharger also having an media gap machine (10) as claimed in claim 1.

18. The media gap machine as claimed in claim 1, characterized in that the cover cap (18) is embodied in a flow-optimized fashion in the shape of a half ovoid, and is arranged centrically or eccentrically with respect to the rotational axis of the rotor (11).

19. The media gap machine as claimed in claim 1, characterized in that a plurality of radially outwardly protruding securing struts (20), which are configured to bear against or be attached to one of the stator teeth (15) in each case, are arranged on the inner sleeve (19).

20. The media gap machine as claimed in claim 1, characterized in that a plurality of radially outwardly protruding coil mounts (27) for coils (28) of the drive winding (16) are arranged on the outer sleeve (23) and distributed uniformly over the circumference.

\* \* \* \* \*